United States Patent
Kueper et al.

(10) Patent No.: US 6,668,631 B1
(45) Date of Patent: Dec. 30, 2003

(54) METHOD OF CHECKING THE PERFORMANCE OF CATALYSTS IN INTERNAL-COMBUSTION ENGINES

(75) Inventors: Paul Kueper, Wiernsheim (DE); Stefan Peter, Gross-Umstadt (DE); Jens Mueller, Markgröningen (DE)

(73) Assignees: Dr. Ing. h.c.F. Porsche Aktiengesellschaft, Stuttgart (DE); Audi Aktiengesellschaft, Ingolstadt (DE); Bayerische Motoren Werke Aktiengesellschaft, Munich (DE); Volkswagen Aktiengesellschaft, Wolfgang (DE); DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/889,174
(22) PCT Filed: Mar. 1, 2000
(86) PCT No.: PCT/EP00/01719
§ 371 (c)(1), (2), (4) Date: Jul. 12, 2001
(87) PCT Pub. No.: WO00/53905
PCT Pub. Date: Sep. 14, 2000

(30) Foreign Application Priority Data

Mar. 9, 1999 (DE) .......................................... 199 10 336

(51) Int. Cl.$^7$ ............................................... G01M 19/00
(52) U.S. Cl. .................................................... 73/118.1
(58) Field of Search ................................. 73/116, 118.1

(56) References Cited

U.S. PATENT DOCUMENTS 5,592,815 A   1/1997 Jelden et al.

FOREIGN PATENT DOCUMENTS

EP      0 756 072      1/1997
WO      WO 99/06681    2/1999

*Primary Examiner*—Edward Lefkowitz
*Assistant Examiner*—Maurice Stevens
(74) *Attorney, Agent, or Firm*—Crowell & Moring LLP

(57) ABSTRACT

A process is suggested for checking the catalyst performance in internal-combustion engines, in which by means of detected operating parameters of the internal-combustion engine similar operating conditions are determined. It is suggested to compute from a defined number of measured exhaust gas values during a similar operating condition a statistically backed average exhaust gas value and compare it with a permissible exhaust gas value stored for this operating condition, so that a defective catalyst is recognized in the event of a deviation of the actually determined exhaust gas value from the permissible exhaust gas value.

19 Claims, 2 Drawing Sheets

METHOD OF CHECKING THE PERFORMANCE OF CATALYSTS IN INTERNAL-COMBUSTION ENGINES

BACKGROUND AND SUMMARY OF THE INVENTION

The invention relates to a method of checking the performance of catalysts in internal-combustion engines, which catalysts have the task of reducing pollutants existing in the engine exhaust gas.

A method of checking the efficiency of a catalyst is known from German Patent Document DE 37 19 174 A1. In the case of this known method, the mixture ratio of the gas constituents of the gas mixture flowing into the catalyst is compared with the mixture ratio of the gas constituents of the gas mixture flowing out of the catalyst. By means of this result, an evaluation of the catalyst performance is carried out. The catalyst performance, for example, is determined with respect to the correlation between the HC conversion capacity and the oxygen storage capacity of the catalyst. The oxygen storage capacity is measured oxygen probes, which are arranged in front of and behind the catalyst.

On the basis of the ratio of the pollutant concentration in front of and behind the catalyst, a so-called conversion rate is determined. At a conversion rate of approximately 100%, the catalyst is recognized to be in full working order; whereas, for example, at a conversion rate of less than 92%, the catalyst is found to no longer be in working order.

The monitoring of the performance of the catalyst is necessary because defects at the catalyst can considerably increase the exhaust gas emissions. For this reason, it is endeavored to improve the monitoring of the catalyst and therefore meet the strict exhaust emission standards and the increasing demands for on-board diagnosis (OBD).

In comparison with the known evaluation method, the method of checking the catalyst performance in an internal-combustion engine has the advantage that a relatively large number of exhaust gas parameters (such as concentration), which are measured in similar selected operating conditions of the internal-combustion engine, according to statistical methods, are condensed to an up-to-date average exhaust gas value. This value is backed statistically, can be assessed with respect to its informational precision, and correlates with the quality of the catalyst performance. The up-to-date average exhaust gas value is compared with an exhaust gas threshold value which, in turn, was determined via a threshold value catalyst which was aged in a defined manner. In the case of the suggested method according to the invention, a second sensor in front of the catalyst can be eliminated. Because the differences between the exhaust gas conversion from a new catalyst to an aged or defective catalyst are the clearest in transient conditions, such as acceleration and deceleration when the engine and the catalyst system are running hot, by means of the method according to the invention, an evaluation of the catalyst performance can intentionally take place under these operating conditions. It is therefore not necessary to pass through all kinds of driving conditions in order to evaluate the catalyst performance and permanently monitor these operating conditions, particularly the less critical ones, whereby the control unit is in turn relieved of unnecessary computing operations.

Advantageous further developments and improvements of the method according to the invention can be achieved.

The determination of the exhaust gas value to be compared in an up-to-date manner from a number of similar past values has the advantage that the measurements are statistically backed and the evaluation therefore takes place on the basis of a sufficiently large number of measured values. A very simple and informative variant for summarizing a definable number of measured values is the formation of an average value. Likewise, it is possible, although it is not explained in detail in the following, to form the center of gravity of a surface or the integral by way of the definable number of measured exhaust gas values.

Other objects, advantages and novel features of the present invention will become apparent from the following detailed description of the invention when considered in conjunction with the accompanying drawings.

DETAILED DESCRIPTION OF THE DRAWINGS

Figure 1:
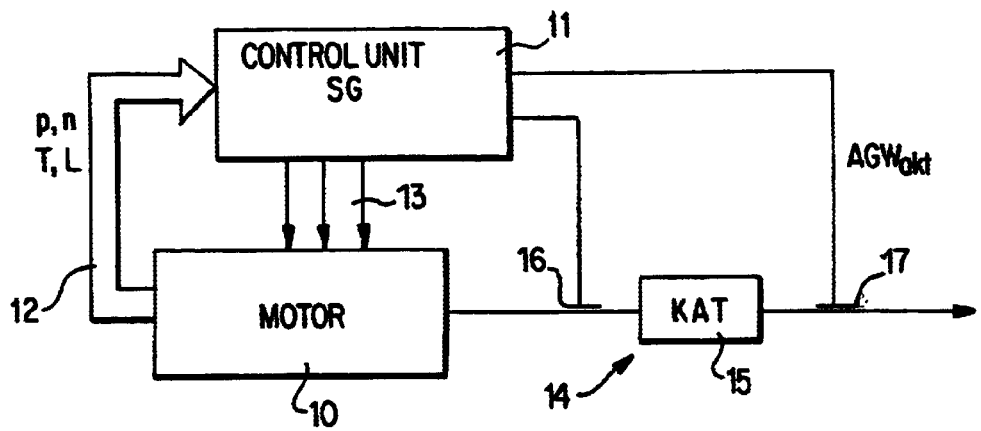
FIG. 1 is a basic block diagram of an engine with a catalyst that is monitored.

FIG. 1 is a basic block diagram of the engine block 10 of an internal-combustion engine. Different engine operating parameters that are detected via sensors (not shown) on the engine are fed to a control unit 11 by way of a connection. The control unit 11 controls the operation of the engine by way of corresponding commands to correcting variables. The output of the actuating variables is symbolically indicated by the connection arrows 13. The engine 10 is coupled with the exhaust gas pipe train 14 in which the catalyst 15 is arranged. In FIG. 1, a first sensor 16 is arranged in front of the catalyst 15 and a second sensor 17 is arranged behind the catalyst. The measured signals of the second sensor 17, in each case, are fed to the control unit 11, in which case the sensor 16 in front of the catalyst can be eliminated in the case of the method according to the invention.

The method according to the invention will now be explained with reference to the generally illustrated flow chart of FIG. 2.

Figure 2:
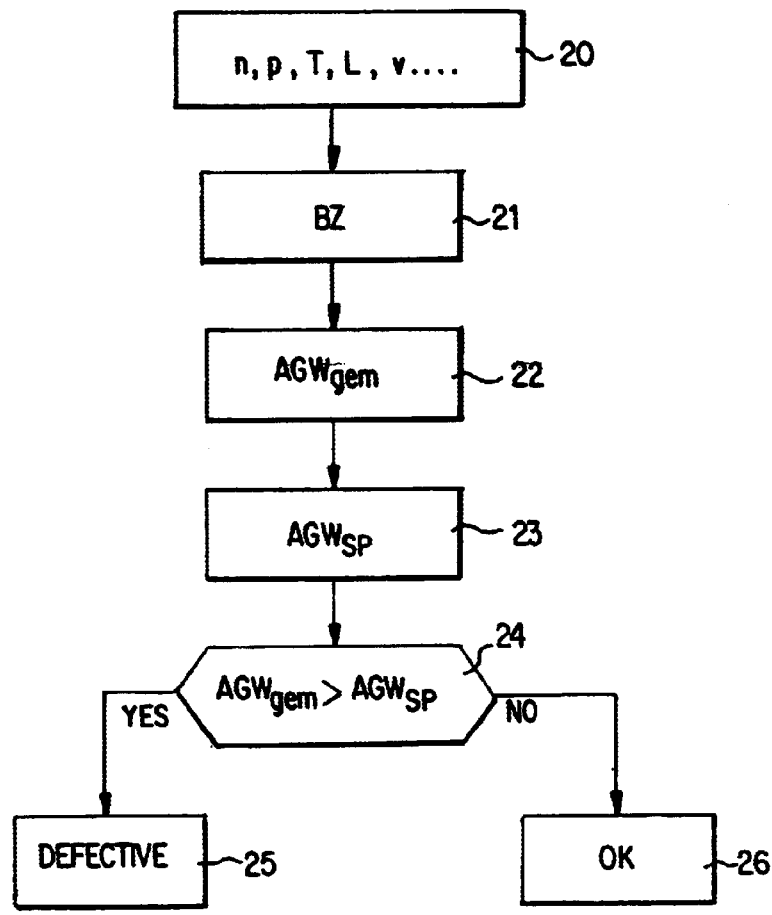
FIG. 2 is a flow chart of the method according to the present invention in a general form.

In FIG. 2, in a first method step 20, the operating parameters of the internal-combustion engine, such as the rotational speed n, the pressure p, the temperature T, the load L, the speed v, and the like, are detected. In a subsequent operating step 21, the momentary operating condition BZ of the internal-combustion engine is determined by means of these operating parameters. Then, in step 22, the actual exhaust gas value $AGW_{gem}$ is measured. In the subsequent operating step 23, the admissible exhaust gas reference value $AGW_{SP}$ pertaining to the operating condition is read out of a memory device. The admissible exhaust gas reference value $AG_{SP}$ is determined, for example, in the application or on a roller-type exhaust gas test stand for the individual operating points and is then stored, for example, in a characteristic diagram which spans the rotational speed and load range. Since not all operating ranges of the operation of an internal-combustion engine are critical with respect to the exhaust gas values, it may under certain circumstances be useful to carry out a monitoring of the exhaust gas values only in the operating ranges in which a defective catalyst has the strongest negative effect on the exhaust gas values. In a query step 24, it is checked whether the measured exhaust gas value $AGW_{gem}$ is greater than the reference value for the exhaust gas $AGW_{SP}$ taken from the memory. If the answer to the query $AGW_{gem} > AGW_{SP}$
is YES, it is recognized that the functioning of the catalyst performance is not okay in the subsequent operating step 25. If the answer to the query was NO, in operating step 26, the catalyst is recognized as being okay and therefore in full working order.

Figure 3:
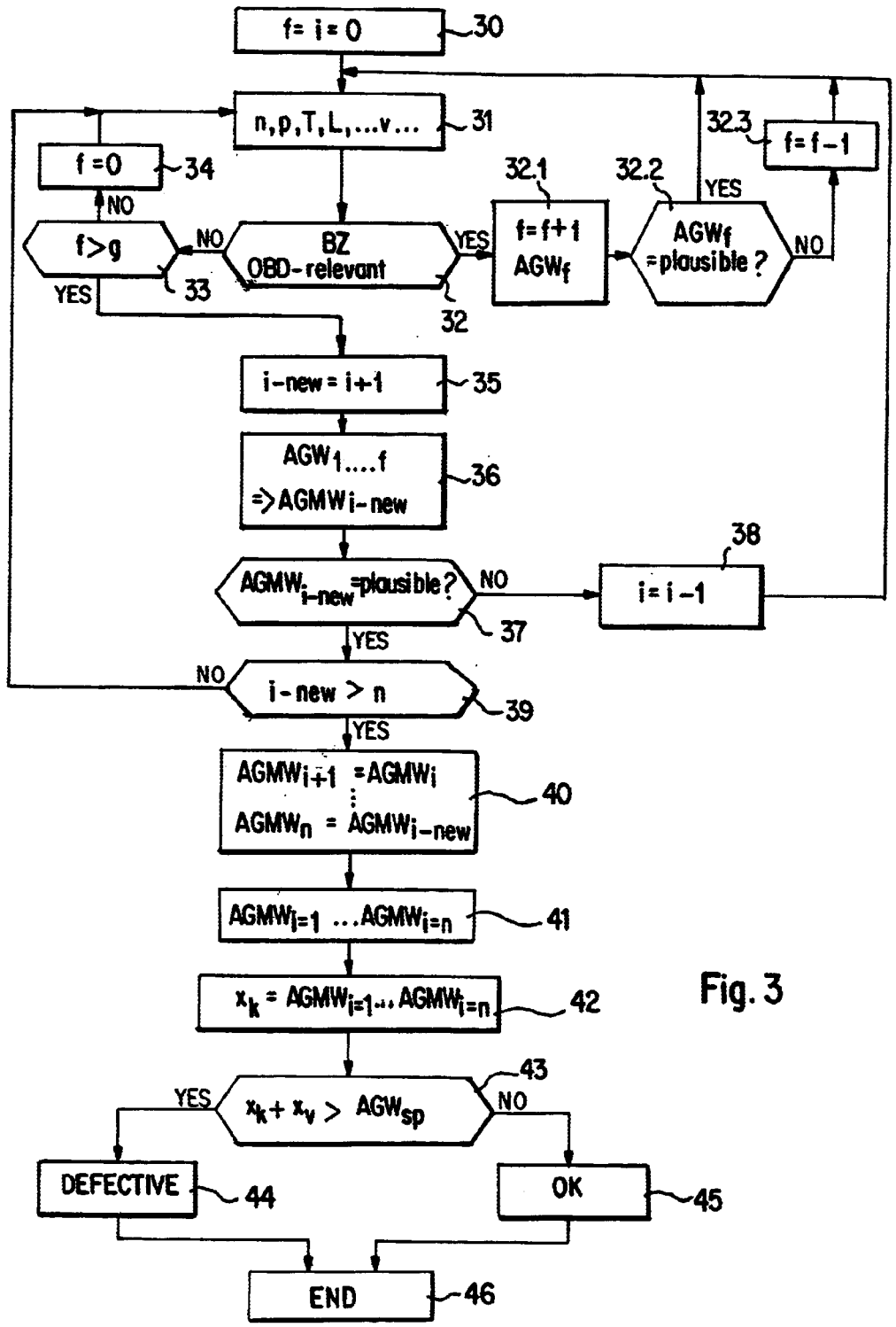
FIG. 3 is a flow chart of the method according to the present invention in a detailed form.

In the following, the method according to the invention will be explained in greater detail with reference to FIG. 3.

In a first operating step 30, the method for checking the catalyst performance is started, in which two numerical values i and f are set to zero; i=0 and f=0. The numerical values i and f can each be counted in a counter, which is conventional and therefore not explained in detail. In operating step 31, the momentary operating parameters are detected and the operating condition BZ is determined by means of these operating parameters. In the subsequent query 32, it is checked whether the operating condition BZ is in a range which is relevant to the evaluation and in which an informative result is ensured when monitoring the catalyst function. Transient driving conditions, such as acceleration operations, are particularly well suitable for the catalyst diagnosis because weaknesses of the catalyst with respect to increased pollutant concentrations behind the catalyst are exhibited here the soonest. Under such defined driving conditions, equally high pollutant concentrations will occur if the engine does not alter its emission behavior. When the starting basis of the exhaust gas composition in front of the catalyst is the same, the analysis of the exhaust gas composition behind the catalyst is therefore most informative.

If the answer to query 32 is YES, in a subsequent operating step 32.1, the numerical value f is increased by one, so that the following applies: f=f+1. Simultaneously, the actual exhaust gas value $AGW_f$ is measured. In the subsequent operating step 32.2, it is checked whether the actually measured exhaust gas value $AGW_f$ is plausible. With respect to plausibility, it is queried during this check whether the measured exhaust gas value $AGW_f$ is within a defined range of possible measured values. If the exhaust gas value $AGW_f$ was plausible, the YES-output of this query leads to the operating step 31, in which the detection of a next exhaust gas value is started. A NO-response to query leads via operating step 32.3 in which the numerical value f is decremented again by one, so that the following applies: f=f−1. This means that the implausible exhaust gas value $AGW_f$ is not taken into account in the rest of the method.

A NO-response to query step 32 leads to another query 33, in which it is checked whether an OBD-relevant operating condition previously occurred within a definable time or for a definable number of measurements. For reasons of simplicity, the value g is entered into the program flow chart for checking a time duration as well as for checking a definable number of measurements, so that step 33 will result in the query f>g.

A NO in query 33, in an operating step 34, will set the counter f back to the zero value (f=0), and will then, in operating step 31, again start the detection of the operating parameters and the determination of the operating condition BZ. If the answer to query 33 (f>g) was YES, the YES-output leads to a subsequent operating step 35. Here, the counter i is increased by the value 1, so that the following applies: $i_{new}$=i+1. Subsequently, in operating step 36, the average exhaust gas value $AGMW_{i-new}$ is formed from the number 1 . . . f of measured exhaust gas values $AGW_{1-f}$. This new average exhaust gas value $AGMW_{i-new}$ will be checked with respect to plausibility in an operating step 37. The plausibility check 37 checks whether the determined average exhaust gas value $AGMW_{i-new}$, is in an admissible range (for example, $0 < AGMW_{i-new} < AGMW_{MmaX}$). In this case, possible values caused by measuring errors are to be excluded from a further analysis. The result is that a NO to query step 37—$AGMW_{new}$ not plausible leads back to operating step 31—by way of an operating step 38, in which the counter i is decremented by 1. At step 31, the actual operating parameters are detected again and the operating condition BZ is determined.

However, if the average exhaust gas value $AGMW_{i-new}$ was recognized as plausible and the answer to query 37 is therefore YES, it is checked in a subsequent query 39 whether the counter i has already reached a definable value n. As a rule, the definable value n is selected such that a representative number of measured average exhaust gas values $AGMW_{inew}$ is available. A possible value for n could, for example, be the value 50. If the answer to query 39 is NO, a sufficient number of exhaust gas values has not yet been detected; the process returns to operating step 31; and, as a result, a new average exhaust gas value $AGMW_{i-new}$ will then be determined.

If the determined average exhaust gas value $AGMW_{i-new}$ was plausible, it is checked in a subsequent query 39 whether a definable number n of average exhaust gas values $AGMW_{i-new}$ has already been detected. The check takes place in that a simple comparison of the content of the counter i and thus of "i-new" with the definable number n (i-new<n) is performed. If the result of this comparison is negative, the NO-output leads back to operating step 31, and additional average exhaust gas values $AGMW_{i-new}$ are detected.

If the answer to query 39 is YES, n average exhaust gas values $AGMW_{i-new}$ are detected. In the subsequent operating step 40, the respectively oldest detected value is erased and the newly detected average exhaust gas value $AGMW_{i-new}$ is stored. This function can, for example, be implemented by means of a shift register which, at each data input, shifts all detected values by one value, so that the oldest value will finally drop out. The number of detected and stored measured values will therefore remains constant. All relevant average exhaust gas values $AGMW_{i=1}$ to $AGMW_{i=n}$ are stored in an operating step 41 for further processing. In the subsequent operating step 42, a total average exhaust gas value $X_k$ is determined from these stored average exhaust gas values $AGMW_{i=1}$ to $AGMW_{i=n}$. During the computation, it is useful to calculate a possible standard deviation and permit a reliable confidence range. However, this is not explicitly mentioned in process step 42 because the values for the standard deviation and the confidence range may possibly also assume the zero value and may differ from vehicle to vehicle or from one operating condition to the next. The thus calculated total average exhaust gas value $x_k$ represents a value which is representative of the momentary operating condition of the catalyst.

In the subsequent operating step 43, the computed total average exhaust gas value $x_k$ is acted upon by an offset $x_v$. This offset $x_v$ represents a range determined according to statistic methods, which indicates the extent of the measuring uncertainty of the computed average exhaust gas value. Thus, the sum of the total average exhaust gas value $x_k$ and the offset $x_v$ is compared with the reference value ($x_k$+ $x_v °AGW_{sp}$) taken from a memory for this operating condition BZ. If the answer to query 43 was YES, the defect information is obtained in operating step 44 that the catalyst function is not okay. However, if the reference value was not exceeded, in operating step 45, the catalyst is recognized to be in working order—okay—. Operating step 44 as well as operating step 45 are connected with the last operating step 46, in which the end of the program sequence is recognized so that then a new analysis can possibly take place.

When evaluating and checking the performance reliability of a catalyst, as a rule, HC, CO and NOx reactions in the catalyst or reactions of other exhaust gas constituents are analyzed, in which case the exhaust gas concentration and its sequence is detected as a measured variable for these effects.

In another embodiment, the process can be implemented using two sensors. When the two sensors are arranged in the exhaust pipe train, as illustrated in FIG. 1, it is possible to evaluate in critical ranges the exhaust gas composition in front of and behind the catalyst and, by means of a plausibility comparison check, the result of the processes. It can therefore be checked whether the engine has changed its emission behavior. In the event of a change, the diagnosis can be adapted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of checking the operation of a catalyst arranged in an exhaust gas pipe of an internal-combustion engine, a sensor being arranged behind the catalyst and detecting exhaust gas values, the method comprising the acts of:

determining similar operating conditions of the internal-combustion engine via detected operating parameters;

forming a statistically backed total average exhaust gas value from a defined number of exhaust gas values during a particular similar operating condition;

comparing said statistically backed total average exhaust gas value with a maximally permissible exhaust gas value stored in a memory for the particular similar operating condition;

recognizing the catalyst is defective when the statistically backed total average exhaust gas value exceeds the permissible exhaust gas value;

checking a result of the comparison of the statistically backed total average exhaust gas value with the permissible exhaust gas value stored in the memory via a second sensor arranged in front of the catalyst and via an analysis of a conversion rate with respect to plausibility of the statistically backed total average exhaust gas value.

2. The method according to claim 1, wherein for a selected operating condition to be evaluated, the method calculates an average exhaust gas value from a definable number of measured exhaust gas values.

3. The method according to claim 2, wherein the statistically backed total average exhaust gas value is determined from a definable number of average exhaust gas values computed during a particular operating condition.

4. The method according to claim 3, wherein the determined total average exhaust gas value is acted upon by an operating-point-dependent offset value determined via statistical analysis.

5. The method according to claim 4, wherein checking of the catalyst operation is only performed in operating conditions having an increased nitrogen oxide fraction, CO fraction and/or HC fraction in the exhaust gas.

6. The method according to claim 4, wherein the measured exhaust gas value is optionally mathematically linked with an engine condition value.

7. The method according to claim 6, wherein said engine condition value is at least one of an air flow rate and a fuel flow rate.

8. The method according to claim 3, wherein checking of the catalyst operation is only performed in operating conditions having an increased nitrogen oxide fraction, CO fraction and/or HC fraction in the exhaust gas.

9. The method according to claim 3, wherein the measured exhaust gas value is optionally mathematically linked with an engine condition value.

10. The method according to claim 9, wherein said engine condition value is at least one of an air flow rate and a fuel flow rate.

11. The method according to claim 2, wherein checking of the catalyst operation is only performed in operating conditions having an increased nitrogen oxide fraction, CO fraction and/or HC fraction in the exhaust gas.

12. The method according to claim 2, wherein the measured exhaust gas value is optionally mathematically linked with an engine condition value.

13. The method according to claim 12, wherein said engine condition value is at least one of an air flow rate and a fuel flow rate.

14. The method according to claim 1, wherein checking of the catalyst operation is only performed in operating conditions having an increased nitrogen oxide fraction, CO fraction and/or HC fraction in the exhaust gas.

15. The method according to claim 14, wherein the measured exhaust gas value is optionally mathematically linked with an engine condition value.

16. The method according to claim 15, wherein said engine condition value is at least one of an air flow rate and a fuel flow rate.

17. The method according to claim 1, wherein the measured exhaust gas value is optionally mathematically linked with an engine condition value.

18. The method according to claim 17, wherein said engine condition value is at least one of an air flow rate and a fuel flow rate.

19. The method according to claim 1, wherein checking of the catalyst operation is performed in transient operating conditions while the engine and the catalyst system are running hot.

* * * * *